United States Patent [19]

Kalina

[11] 4,212,249

[45] Jul. 15, 1980

[54] DYNAMIC-COMPENSATING MAGNETIC SUPPORT APPARATUS

[76] Inventor: Alexander I. Kalina, 5565 Gasmer #674, Houston, Tex. 77035

[21] Appl. No.: 925,513

[22] Filed: Jul. 17, 1978

[51] Int. Cl.² .............................................. B61B 13/10
[52] U.S. Cl. .............................. 104/281; 104/138 R; 248/206 A; 308/3 R; 335/286
[58] Field of Search ................. 104/148 MS, 138 R; 335/285, 286; 248/206 A, 362; 211/DIG. 1; 294/65.5; 308/3 R

[56] References Cited

U.S. PATENT DOCUMENTS

| 3,783,794 | 1/1974 | Gopfert et al. | 104/148 MS |
| 4,023,500 | 5/1977 | Diggs | 104/148 MS |

FOREIGN PATENT DOCUMENTS 261085  10/1911  Fed. Rep. of Germany ... 104/148 MS

Primary Examiner—John J. Love
Assistant Examiner—Ross Weaver
Attorney, Agent, or Firm—Arnold, White & Durkee

[57] ABSTRACT

A magnet, a support arm for connecting the magnet to a load, and an adjusting mechanism for adjusting a magnitude of the field of the magnet in relation to variations in the load and method are disclosed.

8 Claims, 7 Drawing Figures

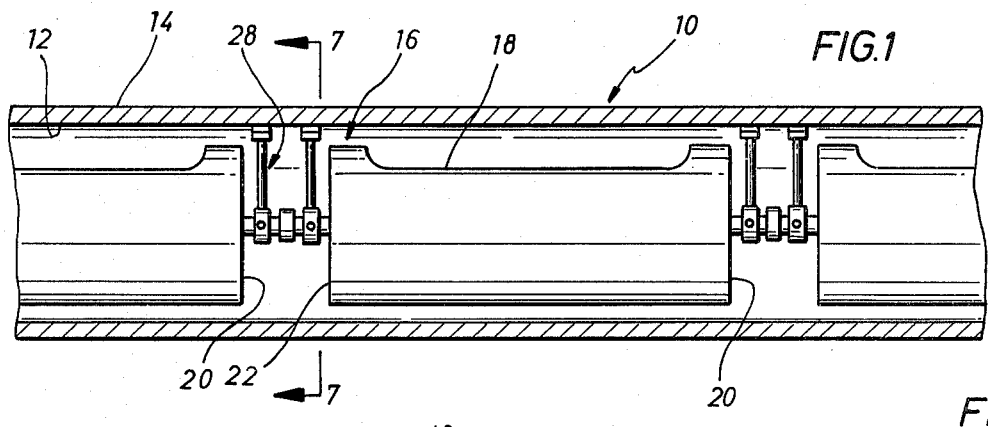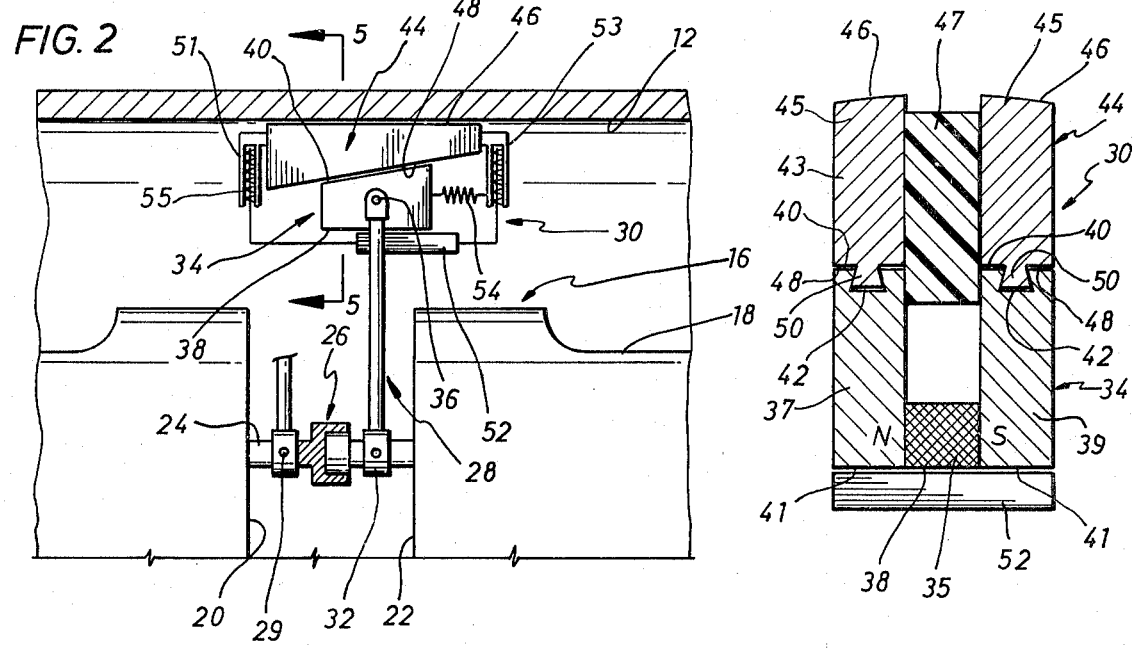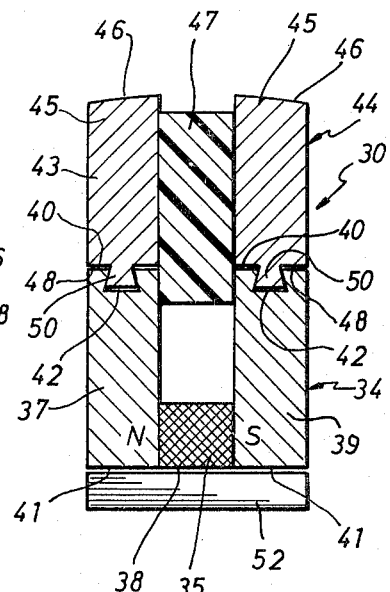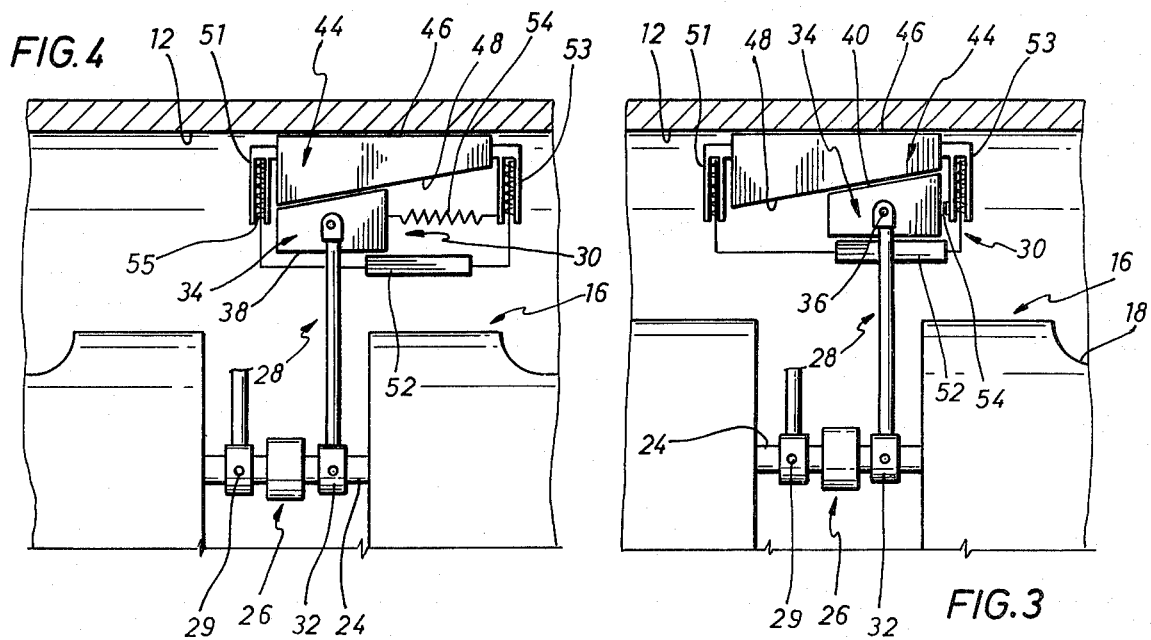

DYNAMIC-COMPENSATING MAGNETIC SUPPORT APPARATUS

BACKGROUND OF THE INVENTION

The present invention relates generally to material handling and transportation and to apparatus for supporting any object directed along a relatively smooth metallic guideway. This invention has particular utility in capsulate-type material conveying systems in a pipeline and provides capsule support therein.

It has been discovered that certain energy efficiencies may be achieved by introducing liquid, gaseous, or solid materials into a capsule and then transporting the capsule through a pipeline. Systems exist whereby packaged or bulk material is introduced into wheeled capsules which are propelled through a pipeline by columns of air. Whereas the present invention may be utilized in a wide variety of environments, particular utility has been found in pipeline capsule systems.

Serious difficulties may arise through the use of wheeled capsules. For example, because of the space limitations within a pipeline, the wheels would necessarily be of relatively small diameter, and frictional considerations require an extraordinary care in the manufacture of bearing surfaces to accommodate the loads on the small wheels. Moreover, the maintenance of wheels on capsules requires an extraordinary expenditure of time and materials to achieve suitable efficiency.

Whereas the present invention solves many problems existing in known materials handling or transportation systems, it solves particular problems in connection with pipeline capsule systems.

It is, therefore, a general object of the present invention to provide a novel, improved apparatus which minimizes or reduces the problems associated with prior art materials handling and transportation systems.

It is another object of the present invention to provide a novel, improved dynamic-compensating magnetic support which can adjust to variations in loading and changes in direction.

It is a more particular object of the present invention to provide a novel method and apparatus for magnetically supporting a pipeline capsule.

The limitations with respect to wheels as a supporting mechanism for capsules are not intended to be exhausted but rather are among many shortcomings which tend to impair the effectiveness of previously known apparatus. Other noteworthy limitations or problems may also exist; however, those noted above should be sufficient to demonstrate that apparatus for supporting a pipeline capsule appearing in the art have not been altogether satisfactory.

An apparatus for supporting a pipeline capsule according to a presently preferred embodiment of the invention intended to substantially accomplish the foregoing objects includes a magnet for producing an upward capsule-supporting force, a radial arm attached at one end to the magnet and attached at its other end to a capsule, and a force-adjusting mechanism for adjusting the magnitude of the upward capsule-supporting force in relation to a magnitude of a downward force on the capsule. Alternative embodiments of the present invention include, on the one hand, providing a magnetic flux cancellation mechanism for modifying the strength of the magnetic field supporting the capsule or, on the other hand, displacing the position of the magnet to reduce its upward acting component of force.

Additional objects, features and advantages of the present invention will become apparent with reference to the following detailed description of preferred alternative embodiments thereof in connection with the accompanying drawings, wherein like reference numerals have been applied to like elements, in which:

BRIEF DESCRIPTION OF THE DRAWINGS

FIG. 1 depicts in partial, cross-sectional view a train of capsules supported by the apparatus of the present invention;

FIG. 2 is a partial sectional, partial-schematic of a magnetic field limiting embodiment of the apparatus of the present invention;

FIG. 3 is the apparatus of FIG. 2 in a low-flux condition;

FIG. 4 is the apparatus of FIG. 2 in a generally high flux configuration;

FIG. 5 is a cross-sectional view taken through section lines 5—5 appearing in FIG. 2;

DETAILED DESCRIPTION

Figure 7:
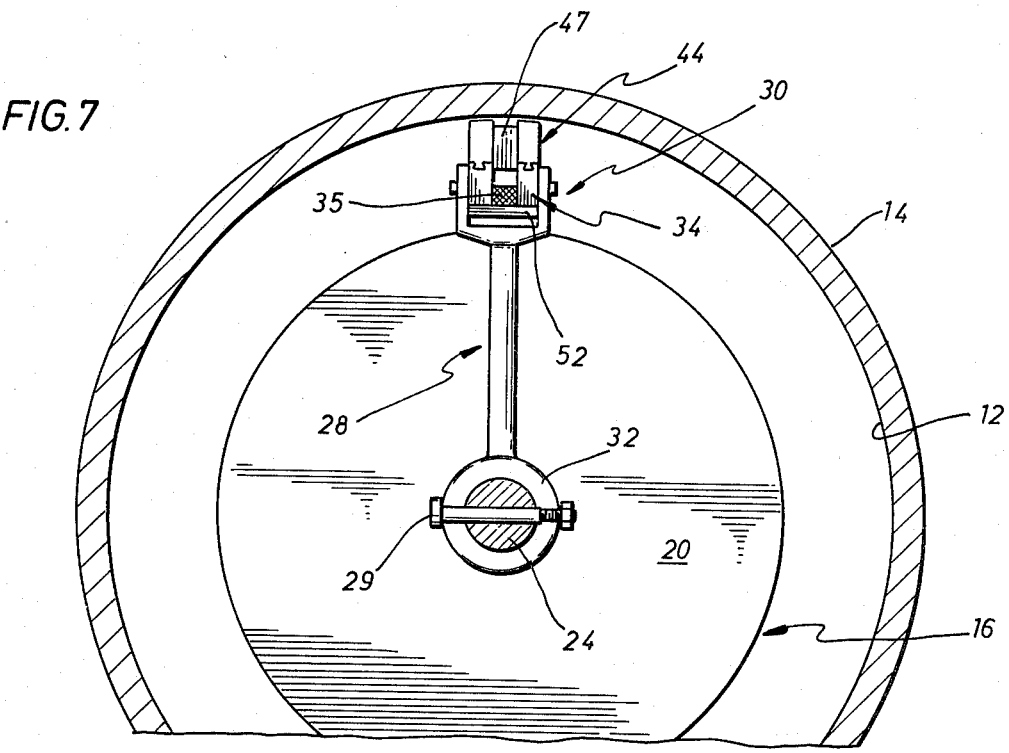
FIG. 7 is a view through section lines 7—7 appearing in FIG. 1.

With reference now to the figures, there can be seen a pipeline 10 of conventional construction. This pipeline 10 may be fashioned above the surface of the ground on towers of conventional design or may be subterranean or subsea. In any event, the pipeline is comprised of a magnetic material, such as iron or steel and has an interior surface 12 and an exterior surface 14.

The pipeline is operable to form a guideway for a plurality of capsules 16 situated therein. The capsules may be combined in trains of, say, three or four or fifteen or twenty capsules or the pipeline may be entirely filled with capsules. In any event, each capsule is comprised of a generally cylindrical body portion with an open top 18. A generally circular front wall 20 and a generally circular back wall 22 are provided. Attached to or passing through the front wall and back wall of each capsule 16 is a shaft 24. The shaft carries a coupling 26 of conventional design and a radial arm 28. The radial arm has at one end a dynamic-compensating magnetic support apparatus 30 as will hereinafter be more fully described. At another end of the radial arm there may be provided a journal or collar 32 which in the case of at least one embodiment pivots about the shaft.

As may be seen in FIGS. 2 through 5 and 7, in a first embodiment, a magnet apparatus 34 is suitably attached, for example by a bolt 36, to the radial arm 28. The magnet apparatus includes a magnet 35 having one end (N) in contact with a first field transfer member 37 and another end (S) in contact with a second field transfer member 39. The magnet may be conventionally attached to the first and second field transfer members. The radial arm 28 may be prevented from rotating about the shaft 24 by means of a bolt 29 which passes through the collar 32 and the shaft 24. The magnet has a generally flat bottom surface 38 contiguous with the bottom surfaces 41 respectively of the first and second field transfer members. Each field transfer member has an inclined upper surface 40. Each inclined upper surface 40 has a rabbet 42 fashioned therein (See FIG. 5).

A friction shoe 44 is provided which has a first friction member 43 and a second friction member 45, each of which has a generally curved upper surface 46 and an inclined lower surface 48. Each inclined lower surface 48 of the friction members is arranged to slide along the inclined surfaces 40 of the field transfer members. A projection 50 is fashioned along the inclined edge of each friction member to cooperate with the rabbets 42 in the field transfer members 43 and 45 facilitate maintaining those members in sliding alignment. A non-ferrous or plastic connecting member 47 may be provided to connect the friction members. The connecting member may extend into the space between the field transfer member 37 and 39 to facilitate a sliding alignment.

The friction shoe 44 friction members 43 and 45 should be fashioned from a material such as iron or steel which has the property of transmitting substantially unattenuated the lines of force of the magnet 35. Moreover, the upper surfaces 46 of the friction members 43 and 45 frictionally engage the inside surface 12 of the pipeline 10 and, therefore, the material should have suitable hardness characteristics to withstand the dynamic friction as will hereinafter be more fully explained.

A magnetic field reducing plate 52 is positioned on the lower side 38 of the magnet apparatus 34. This plate 52 serves to reduce the magnetic field produced by the magnet by cancelling or "shorting" the lines of magnetic flux. This plate 52 may be iron or steel or other suitable material capable of performing this function. In addition, it will be appreciated that another magnet having an opposite polar orientation from the magnet 35 may be used in this capacity.

The magnetic reducing plate 52 is connected to the friction shoe 44 by means of a pair of telescoping members 51 and 53 with a spring 55 arranged to urge the plate 52 against the magnetic field transfer members 37 and 39 as schematically shown in the drawings. That is, when the magnetic apparatus 34 is displaced to the left along the incline 48, the magnetic reducing plate 52 is cammed downwardly (See FIG. 4). Movement of the magnet apparatus 34 away from the influence of the plate 52 results in an increase in the magnetic attraction between the magnet apparatus 34 and the inside 12 of the pipeline 10.

Alternatively, when the magnet apparatus is moved to the right along the incline 48, the magnet apparatus moves toward the reducing plate 52, thereby reducing the magnetic attraction between the magnet and the inside surface of the pipeline.

It will be appreciated that the magnetic reducing plate 52 may be coordinated with the movement of the friction shoe 44 through a variety of arrangements known to those skilled in the art. The plate 52 and the friction shoe 44 may be rigidly coupled or there may be a more sophisticated linking arrangement between the magnet apparatus 34 and the plate 52 known to those skilled in this art which coordinates the movement of these respective parts with some predetermined relationship. For example, the magnetic reducing plate may be displaced a greater or lesser amount than the corresponding displacement of the magnet apparatus.

A biasing arrangement 54 shown schematically as a spring is arranged to maintain the friction shoe in a predetermined position with respect to the magnet apparatus. It will, of course, be appreciated that stops and the like may be arranged to limit the travel of the friction shoe in relation to the magnet apparatus. In any event, the biasing arrangement 54 which may be a spring, a hydraulic device, or any other suitable apparatus, has a sufficient biasing force to maintain the friction shoe 52 and magnet 34 in a relatively constant position as will hereinafter be more fully described.

The upper surface 46 of the friction foot 44 frictionally engages the inside surface 12 of the pipeline 10 with considerable force. That is, the magnet 35 causes the friction foot 44 to be urged against the inside surface 12 of the pipeline. When the capsule is loaded, there is a downward force acting on the radial arm 28 which pulls the magnet apparatus down toward the bottom of the inclined surface of the friction shoe, as shown in FIG. 4. The magnet apparatus is displaced away from the plate, and the magnetic attraction between the magnet apparatus and pipeline increases. When the capsule is fully loaded, the magnet 35 still produces sufficient force to support the capsule and its load. The capsule 16 may be displaced along the length of the pipeline with relatively low dynamic frictional forces between the friction shoe 44 and the pipeline.

The friction foot serves to transmit in a substantially unattentuated condition the magnetic force lines from the magnet to the pipeline.

When the capsule is in a relatively light condition, there is a relatively less downward force on the radial arm. This results in a relatively greater magnetic force urging the magnet 35 toward the pipeline. The increased force cams or wedges the magnet apparatus 34 up the inclined surface of the friction shoe. The movement of the magnet apparatus causes a corresponding reduction of the magnetic flux as a result of the compensating plate 52. Therefore, the magnetic force urging the magnetic apparatus 44 against the friction shoe is reduced, and the magnetic apparatus will then move to an equilibrium position at some location on the friction shoe surface.

It will be appreciated that the biasing mechanism 54 may be adjusted to an equilibrium condition in the magnetic supporting member 30.

In preferred form, each capsule 16 has a magnetic support apparatus 30 attached to the shaft 24 at the front and rear of the capsule. This arrangement results in two magnetic support mechanisms at each capsule coupling 26 so that if one magnetic support member 30 fails, another is available to maintain support of the intersection of the two capsules as the train of capsules proceeds through the pipeline 10.

Figure 6:
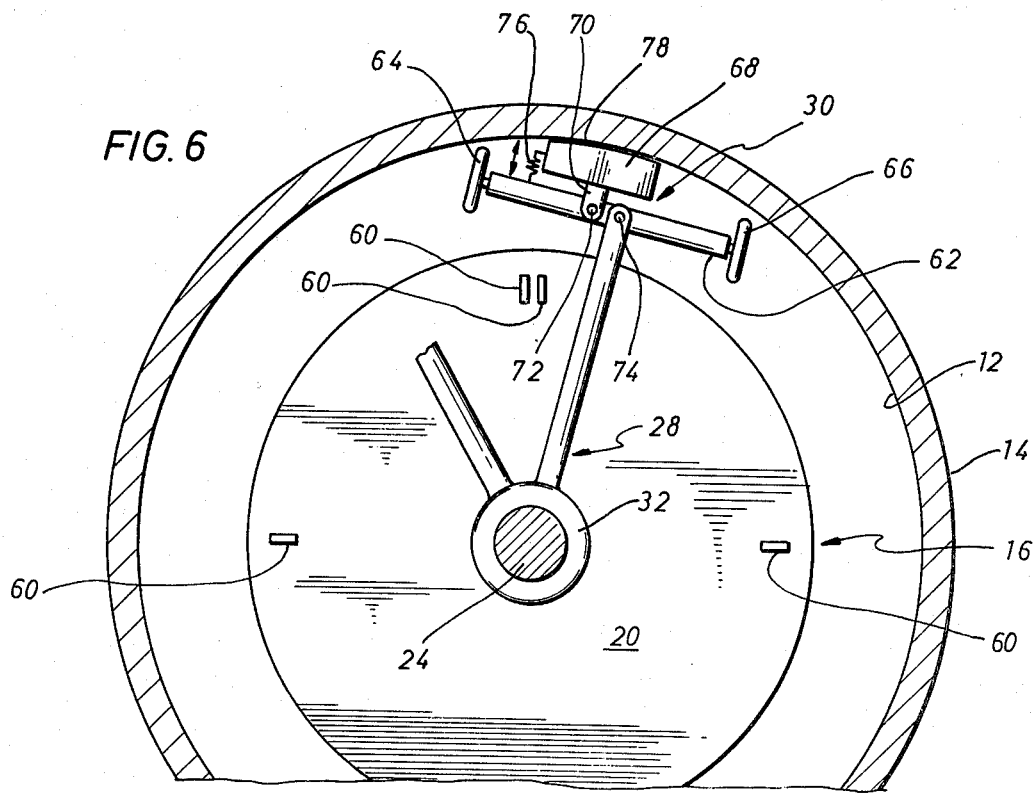
FIG. 6 is a partial-sectional, partial-schematic of an alternative embodiment of the apparatus of the present invention.

An alternative embodiment is shown in FIG. 6. In the alternative embodiment, the radial arm 28 is journaled for rotation about the shaft 24. Stops 60 may be provided to limit the extent of rotation of the arm 28.

The radial arm 28 is pivotally connected to a pivot arm 62. This pivot arm 62 carries a first or upper wheel 64 and a second or lower wheel 66. Each of the wheels rotates about its own axis. However, the respective axes are not colinear. That is, the axis of the first wheel 64 is arranged such that when the first wheel 64 comes into contact with the interior 12 of the pipeline, the pivot arm 28 is urged counterclockwise or upwardly or to the left as seen in FIG. 6. The second or lower wheel 66 is on an axis arranged such that when the second wheel 66 contacts the interior 12 of the pipeline, the pivot arm is urged clockwise or downwardly or to the right as shown in FIG. 6. It will be appreciated hereinafter that the length of the pivot arm 62 and diameter of the first and second wheels respectively are arranged such that both wheels 64 and 66 may not contact the pipeline simultaneously.

A magnet 68 is attached to a support post 70, and the support post 70 is pivotally connected to the pivot arm at a location 72 remote from the connection 74 of the radial arm 28 to the pivot arm 62.

A biasing device 76 such as a spring is provided and is operable to maintain the assembly in equilibrium and without either of the wheels in contact with the pipeline under average load conditions as will hereinafter be more fully explained.

The wheels 64 and 66 are made of any suitable material to withstand periodic contact with the inside surface 12 of the pipeline 10. It will be appreciated that the wheels are not in constant contact with the pipeline but rather serve to angularly displace the radial arm 28 from time to time depending upon the weight of the capsule. For example, and with particular reference to FIG. 6, it will be appreciated that when the capsule 16 is heavily loaded, there is a generally inwardly directed force factor along the longitudinal axis of the radial arm 28. This inward force displaces slightly inwardly the radial arm 28 with the result that the pivot arm 62 is pivoted slightly about the support post pivot 72 of the magnet. The biasing mechanism is temporarily unable to resist this generally clockwise rotation of the pivot arm 62 with the result that the upper or first wheel 64 will come into contact with the pipeline. This first wheel is aligned such that it will cause a counterclockwise rotation of the radial arm 28 to displace the radial arm 28 to a position closer to the vertical. This displacement moves the magnetic support apparatus 30 to a position whereat the magnet 68 provides a greater component of force in the upward direction to support the heavier capsule 16. The magnetic support apparatus achieves a new equilibrium position whereat the biasing mechanism 76 is able to return the pivot arm 62 to a position with both wheels out of contact with the pipeline.

When the capsule 16 is very light, there will be a reduced inward force factor along the radial arm with the result that the pivot arm 62 rotates slightly counterclockwise about the support post pivot 72. The slight counterclockwise rotation of the pivot arm brings the second or lower wheel 66 into contact with the inside surface 12 of the pipeline. As noted above, the lower wheel is operable to displace the radial arm 28 in a generally clockwise direction. This displacement moves the magnetic support apparatus 30 to a position whereat the magnet 68 provides a lesser component of force in the upward direction to reduce the support force for the lightened capsule 16. The magnetic support apparatus achieves a new equilibrium position whereat the biasing mechanism 76 is operable to return the pivot arm 62 to a position with both wheels out of contact with the pipeline.

In operation, a pair of magnetic support members exist at each coupling 26 between capsules 16. As may be seen in the drawings, the travel of the radial arms may be limited by stops 60. That is, when viewed in cross section, one of the radial arms at each coupling is arranged to rotate between say 0° and 90° and the other radial arm is able to rotate between say 360° and 270°. When both of the radial arms are in their vertical position, i.e., one is at 0° and the other is 360°, there is provided a maximum upward support for the capsules. As the respective radial arms are rotated away from their vertical position toward their horizontal position, there is a decreasing upward component of lift available to support the capsules. It will be appreciated that when the radial arms reach an approximately horizontal configuration, there is provided only a very slight upward component to support the capsules.

The biasing device 76 is adjusted such that a pair of magnetic support assemblies 30 (FIG. 6) achieve a generally equilibrium condition for average loads of the capsules at approximately 15° to 45° off the vertical. For increased loads, the radial arms 28 will rotate toward the top of the pipeline. This radial arm rotation, clockwise in one case and counterclockwise in clockwise in the other, results in a net increase in upward supporting force for the capsules. It will be appreciated that when the magnetic support apparatus is displaced to another pipeline position, there is achieved a new equilibrium wherein there is no pivot moment than bringing any wheel into contact with the pipeline. Under such a condition, the capsule may be moved along the length of the pipeline by virtue of a sliding action of the magnet 68 along the inside 12 of the pipeline. It will be appreciated that hardened materials may be placed along a contact surface 78 of the magnet 68 to minimize frictional wear. In any event, the friction between the magnet and the pipeline is reduced by a virtue of the load in the capsule.

SUMMARY OF ADVANTAGES AND SCOPE OF THE INVENTION

It will be appreciated that in constructing a magnetic support member for general utility or for a pipeline capsule system in accordance with the present invention, certain significant advantages are provided. In particular and with respect to pipeline capsules, the present invention eliminates the supporting wheels on which prior art capsules travelled continuously during their transit through a pipeline. The elimination of supporting wheels for capsules significantly reduces maintenance and repair requirements in a pipeline capsule system thereby increasing the reliability of such a system. The present invention includes a dynamic compensation feature which it is believed provides a minimum and generally constant frictional contact between the magnetic supporting apparatus and the interior of the pipeline. Moreover, this feature is useful in compensating for, say, a failure of adjacent magnetic support apparatus. That is, the paired supporting apparatus at each coupling between the capsules provides a fail-safe system in that if one of the magnetic support apparatus fails, the other may dynamically compensate for such failure and provide suitable support for the coupled capsules.

In addition, it will be appreciated, that in some circumstances, for example, during energy transfer to maintain the velocity of the capsules when in transit, the capsules may pass through a zone wherein only the top half of the pipeline is required for their support. That is, energy may be applied to the lower half of each capsule through some energy transfer means as the capsules travel along the pipeline.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. In is to be understood that the forms of the invention herewith shown and described are to be taken as the presently preferred embodiments. Various changes may be made in the shape, size and arrangement of parts. For example, equivalent elements or materials may be substituted for those illustrated and described herein. Parts such as springs and pivots may be reversed, and certain features of the invention may be utilized independently of the use of other features, all as would be apparent to one in the art after having the benefit of this description of the invention. Accordingly, it is intended that all such alternatives, modifications, and variations which fall within the spirit and scope of the invention as defined in the appended claims be embraced thereby.

What is claimed is:

1. Magnetic supporting apparatus comprising:
   a magnet means for producing an upward load-supporting force, the magnet means including an upper inclined surface;
   an arm attached at one end to said magnet means and attachable at another end to a load, said arm being operable to transmit the upward load-supporting force to such a load; and
   adjusting means for adjusting a magnitude of the upward load-supporting force in relation to a magnitude of a downward force of such a load, said adjusting means being substantially continuously operable and comprising a friction foot having a magnetic member-engaging surface and being positionable between said magnet means and a surface of a magnetic member to transmit a magnetic field of said magnet means and to frictionally engage such a magnetic member, the friction foot having a lower inclined surface adjacent to and cooperable with the upper inclined surface of the magnet means to transmit a magnetic field through said friction foot at predetermined positions on said magnet means, and magnetic field reducing means for reducing a portion of the magnetic field of said magnet means.

2. The apparatus of claim 1 wherein said friction foot includes engagement means for slideably engaging said magnet means.

3. The apparatus of claim 1 and further including biasing means for biasing said friction foot into overlying relationship with said magnet means.

4. Magnetic supporting apparatus comprising:
   a magnet means for producing an upward load supporting force;
   an arm attached at one end to said magnet means and attachable at another end to a load, said arm being operable to transmit the upward load-supporting force to such a load; and
   adjusting means for adjusting a magnitude of the upward load-supporting force in relation to a magnitude of a downward force of such a load, said adjusting means being substantially continuously operable and comprising displacement means for pivotally displacing said magnet means in relation to a load, in an arc above the end of the arm attachable to the load to vary the vertical alignment of that end of the arm and the magnet means and thereby vary the vertical component of the upward load supporting force.

5. The apparatus of claim 4 wherein said displacement means comprises a pivot arm, and a wheel rotatably attached to said pivot arm, said wheel being operable to displace said pivot arm in a predetermined circumferential direction when said wheel comes into operable contact with a magnetic member.

6. The apparatus of claim 5 and further including means for urging said wheel towards the magnetic member in response to a force along an axis of said arm.

7. The apparatus of claim 4 wherein said displacement means comprises wheel means for displacing said arm in a first circumferential direction in response to a compression force along a longitudinal axis of said arm and for displacing said arm in a second circumferential direction, having an opposite sense from said first circumferential direction, in response to a tension force along the longitudinal axis of said arm.

8. Magnetic supporting apparatus comprising:
   a magnet means for producing an upward load supporting force;
   an arm attached at one end of said magnet means and attachable at another end to a load, said arm being operable to transmit the upward load-supporting force to such a load; and
   adjusting means for adjusting a magnitude of the upward load-supporting force in relation to a magnitude of a downward force of such a load, said adjusting means being substantially continuously operable and comprising a friction foot having a magnetic member-engaging surface and being positionable between the magnet means and a surface of a magnetic member to transmit a magnetic field of said magnet means and to frictionally engage such a magnetic member, and a magnetic field reducing member for reducing a portion of the magnetic field of the magnet means by shorting lines of magnetic flux of the magnet means, the magnetic field reducing member being displaceable relatively to the magnet means to vary the extent to which lines of magnetic flux are shorted.

* * * * *